Sept. 26, 1944. F. S. BEST 2,358,783

MACHINE SCREW NUT

Filed Sept. 29, 1943

INVENTOR.
FRANK S. BEST

BY William D. Hall.
Attorney

Patented Sept. 26, 1944

2,358,783

UNITED STATES PATENT OFFICE 2,358,783

MACHINE SCREW NUT

Frank S. Best, Red Bank, N. J.

Application September 29, 1943, Serial No. 504,245

6 Claims. (Cl. 85—2.4)

(Granted under the act of March 3, 1883, as amended April 30, 1928; 370 O. G. 757)

The invention described herein may be manufactured and used by the Government for governmental purposes, without the payment to me of any royalty thereon.

This invention relates to a method and means for fastening materials together and more particularly to a nut used with machine screws in such a manner that there is a protrusion of only the screw head in the application thereof.

In cabinet making involving the use of woods and plastics, several different methods are used for fastening the pieces of materials together. A common method is to use a wood screw; but its use is limited by the fact that as the bond is subjected to vibration, or as the screw is removed and subsequently tightened, the material yields and the screw eventually loosens and becomes ineffective.

To supplant the use of the wood screw, a machine screw and nut has been used. In using the machine screw and nut, it is necessary to drill a hole completely through the pieces to be bonded, to place the nut in position on one side and to insert the machine screw from the opposite side. This provides a bond which does not have the undesirable features of the wood screw, as indicated above, but it has another feature which may be equally as undesirable. This undesirable feature is the protrusion of the bonding device from both sides of the materials which are bonded. Special types of nuts have been devised for use with machine screws, which may be fastened by clamps, small brads, or wood screws to one of the exposed surfaces of the bonded materials. In the making of cabinets, chests, furniture, and the like, one exposed surface of the pieces to be fastened together may be inaccessible, making it impossible to use this type of machine screw and nut.

Further, in the finishing of woods, it is frequently desirable to have a smooth exposed surface, unmarred by any protruding bonding element, as in the case of cabinet and furniture making. This difficulty is sometimes surmounted by using the machine screw and nut, countersinking the screw head, filling the hole above the screw head with a plastic wood, and finishing thereover. Such surfaces, with the absorption of moisture, and with the expansion and contraction accompanying temperature changes, eventually reveal an imperfect surface.

My invention is designed to surmount the above mentioned difficulties, giving the desirable feature of the wood screw, which is that of protruding from only one surface of the bonded elements, and also giving the desirable mechanical durability features which are inherent in the machine screw and nut.

In describing the features of my invention, reference is made to the accompanying drawing, in which.

Figure 1:
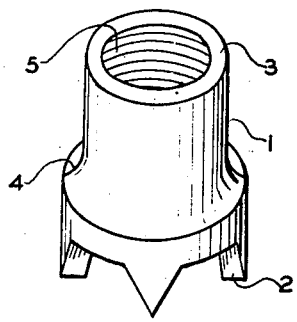
Figure 1 is an elevational view of the machine screw nut proper.

Referring to Figure 1, a machine screw nut 1 is provided with sharp projections 2 on one end, the other end 3 being of smaller outside diameter with a concave beveled surface 4 extending from the larger diameter to the smaller diameter. The inside of the nut is provided with the machine threads 5.

Figure 2:
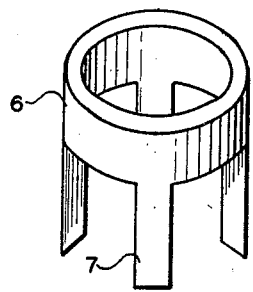
Figure 2 is an elevational view of an auxiliary element which is designed to be used in conjunction with the nut.

Figure 2 illustrates a piece of metal tubing 6 whose outside diameter is substantially equal to the larger outide diameter of the nut 1 and whose inside diameter is equal to or slightly greater than the outside diameter of the smaller end 3 of nut 1. Metal tube 6 is provided at one end with extensions or prongs 7 which are beveled on the inside, providing sharpened edges on the outside.

Figure 3:
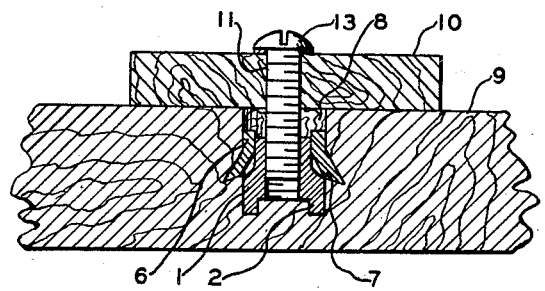
Figure 3 is a sectional view of my invention, illustrating its application in bonding two elements together.

The sectional view shown in Figure 3 illustrates how my invention may be applied. In preparting the pieces to be bonded for the application of this device, a hole 8 must be drilled in one of the pieces 9 the diameter of said hole being equal to the larger outside diameter of the machine screw nut 1, said hole being drilled only part way through, the depth thereof being determined by the dimensions of the nut and the type of material. The said blind hole 8 must be at least as deep as the overall length of the nut 1 minus the length of the projections 2, and sufficient material must be left at the base of the hole for the sharpened projections 2 to be imbedded without piercing the opposite surface. The other element to be bonded 10 must have a hole 11 drilled completely through, the diameter being equal to the outside diameter of the screw 13.

After the materials are thus prepared, the nut 1 may be pressed or driven into the hole 8 in the material 9 so that the projections 2 are firmly imbedded at the base. When this has been accomplished, the metal tubing 6 may be driven or pressed thereover with the extensions 7 pointing downward, and as they are forced against the concave surface 4, they are forced outward into the surrounding material, imbedding themselves firmly and anchoring the nut 1 securely. At this point, the other piece of material to be bonded is placed thereover, with the hole 11 coinciding with the hole in the nut 1 and the screw properly inserted. As the screw is tightened down, the nut 1 is prevented from turning by the projections 2, which are imbedded at the base of the hole 8 and is prevented from loosening by the extensions 7 which are imbedded in the surrounding material. Thus a firm bond is provided between the two elements 9 and 10, with the bonding device protruding from only one surface, and without the undesirable mechanical features inherent in the ordinary wood screw.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A machine screw, a nut therefor with the outside diameter of one end greater than the outside diameter of the other end, a bevelled deflecting surface between said ends, and said end with the greater outside diameter being provided with sharpened projections, and a coaxially disposed piece of metal tubing with the outside diameter substantially equal to the greater outside diameter of said nut, with the inside diameter substantially equal to the smaller outside diameter of said nut, and with sharpened extensions at one end thereof, which extensions may be forced outwardly by the deflecting surfaces aforesaid upon longitudinal movement of the tubing aforesaid, and thereby limit the longitudinal movement in one direction of said nut, and which extensions may be locked in said outward position upon tightening of the nut against said extensions by means of the machine screw aforesaid.

2. A machine screw nut comprising two elements, the first of said elements being threaded on the inside, the outside diameter of one end being greater than the outside diameter of the other end, a bevelled deflecting surface between said ends, and said end with the greater outside diameter being provided with sharpened projections, the second of said elements being cylindrical with an outside diameter substantially equal to the greater outside diameter of said first element, with the inside diameter substantially equal to the smaller outside diameter of said first element, and with sharpened extensions at one end thereof, which extensions may be forced outwardly by said deflecting surfaces upon longitudinal movement of said second element and thereby limit longitudinal movement in one direction of said first element, and which extensions may be locked in such outward position upon longitudinal movement of the first element sufficient to cause it to bear upon said extensions.

3. A machine screw nut with the outside diameter of one end greater than the outside diameter of the other end, a bevelled deflecting surface between said ends, and said end with the greater outside diameter being provided with sharpened projections which may be embedded in wood or the like at the base of a hole into which the nut may be inserted, and a coaxially disposed cylindrical element with an outside diameter substantially equal to the greater outside diameter of said nut, with the inside diameter substantially equal to the smaller outside diameter of said nut, provided with extensions at the end thereof so that when it is forced with said extensions downward over said nut said extensions will be forced outward by the said deflecting surface of said nut into the surrounding material of said hole and lock said projections in their embedded position as aforesaid and when said nut is moved longitudinally it will bear upon said extensions, whereby said nut will be securely anchored against rotational and longitudinal movements.

4. A fastening device for joining two materials, the first of said materials being provided therefor with a through hole and the second with a blind hole, comprising a machine screw adapted to extend through the said through hole, a nut member in threaded engagement with said screw, said nut member adapted for positioning in said blind hole and provided with longitudinally disposed projections adapted to be imbedded in the base of said blind hole, whereby the nut member may be locked against rotational movement relative to the second material, said nut member provided with a bevelled lateral deflecting surface diverging toward said base, an auxiliary member of tubular configuration coaxially disposed about said nut and provided with sharpened extensions directed toward the base aforesaid, said extensions being deflectable laterally into the second material by the deflecting surface aforesaid, whereby the nut may be locked against longitudinal movement toward the open end of said blind hole, the said auxiliary member being lockable in its deflected position by the nut bearing against it toward the open end of the blind hole upon tightening of said machine screw.

5. Fastening means for joining two materials, which means need not completely penetrate one of said materials, comprising a nut which is of greater diameter at one end than at the other and which is provided with a bevelled lateral deflecting surface between said ends and with longitudinally disposed projections on the end of greater diameter; a tubular member which will fit coaxially about the smaller diameter end but not the greater diameter end of the nut, and which is provided with prongs disposed longitudinally and directed toward the wider end of the nut so that, upon longitudinal movement of said tubular member toward said wider end, said prongs will be forced outward laterally by the deflecting surface aforesaid; and a screw threadable into the narrow end of said nut, said nut being caused to bear upon the outwardly disposed prongs upon tightening of said screw.

6. Anchoring means for a machine screw comprising a tubular member provided with longitudinally disposed prongs at one end thereof, and a separate internally threaded nut member engageable with said screw, one end of said nut member being of sufficiently small diameter to allow it to move longitudinally within the tubular member, the other end being of sufficiently large diameter so as to prevent it from entering the tubular member, said nut being provided with bevelled deflecting means disposed between said ends adapted to engage said prongs and deflect them laterally upon longitudinal movement of the tubular member, and provided with projections extending longitudinally from the end of larger diameter to lock said nut member against rotational movement, the end of larger diameter aforesaid adapted to bear against the deflected prongs and lock them in such deflected position upon tightening of said screw.

FRANK S. BEST.